United States Patent
Eichenseer et al.

(10) Patent No.: US 9,039,284 B2
(45) Date of Patent: May 26, 2015

(54) METHOD FOR ENERGY CALIBRATING QUANTUM-COUNTING X-RAY DETECTORS IN A DUAL-SOURCE COMPUTED-TOMOGRAPHY SCANNER

(71) Applicants: Mario Eichenseer, Hirschaid (DE); Steffen Kappler, Effeltrich (DE); Edgar Kraft, Forchheim (DE); Björn Kreisler, Erlangen (DE); Daniel Niederlöhner, Erlangen (DE); Stefan Wirth, Erlangen (DE)

(72) Inventors: Mario Eichenseer, Hirschaid (DE); Steffen Kappler, Effeltrich (DE); Edgar Kraft, Forchheim (DE); Björn Kreisler, Erlangen (DE); Daniel Niederlöhner, Erlangen (DE); Stefan Wirth, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 135 days.

(21) Appl. No.: 13/795,203

(22) Filed: Mar. 12, 2013

(65) Prior Publication Data
US 2013/0251111 A1 Sep. 26, 2013

(30) Foreign Application Priority Data

Mar. 20, 2012 (DE) .......................... 10 2012 204 350

(51) Int. Cl.
*A61B 6/03* (2006.01)
*G01T 7/00* (2006.01)
*G01T 1/29* (2006.01)

(52) U.S. Cl.
CPC ............... *G01T 7/005* (2013.01); *G01T 1/2985* (2013.01)

(58) Field of Classification Search
USPC ....................................... 378/9, 207
See application file for complete search history.

(56) References Cited

U.S. PATENT DOCUMENTS

| 7,696,481 B2 | 4/2010 | Tkaczyk |
| 2012/0236986 A1* | 9/2012 | Schroter ........................ 378/19 |
| 2012/0301002 A1* | 11/2012 | Flohr et al. ................... 382/131 |

FOREIGN PATENT DOCUMENTS

| CN | 101080650 A | 11/2007 |
| CN | 101617246 A | 12/2009 |

(Continued)

OTHER PUBLICATIONS

Xuejun, L. "Study of Nandan Iron Meteorite by X-Ray Fluorescence Micro-Scanning Analysis," Nuclear Techniques, vol. 15, No. 8. 1992.

(Continued)

*Primary Examiner* — Hoon Song
(74) *Attorney, Agent, or Firm* — Harness, Dickey & Pierce, P.L.C.

(57) ABSTRACT

A method is disclosed for energy calibrating quantum-counting x-ray detectors in an x-ray installation including at least two x-ray systems turnable around a center of rotation. A target, for producing x-ray fluorescence radiation, is positioned between the first x-ray source and first x-ray detector and irradiated with x-radiation of the first x-ray source in such a way that x-ray fluorescence radiation which strikes the second x-ray detector from the target is produced by the x-radiation of the first x-ray source. The second x-ray detector is then energy calibrated by way of the x-ray fluorescence radiation of the target. The first x-ray detector can be energy calibrated in the same way with the aid of the x-radiation of the second x-ray source. With the proposed method, the x-ray detectors of a dual-source CT x-ray installation can be calibrated with little expenditure under conditions close to those of the system.

12 Claims, 2 Drawing Sheets

(56) References Cited

FOREIGN PATENT DOCUMENTS

| CN | 101813646 A | 8/2010 |
| CN | 102187208 A | 9/2011 |
| JP | 2004-184123 A | 7/2004 |

OTHER PUBLICATIONS

Chinese Office Action mailed Jan. 26, 2015 for corresponding CN Application No. 201310087107.

* cited by examiner

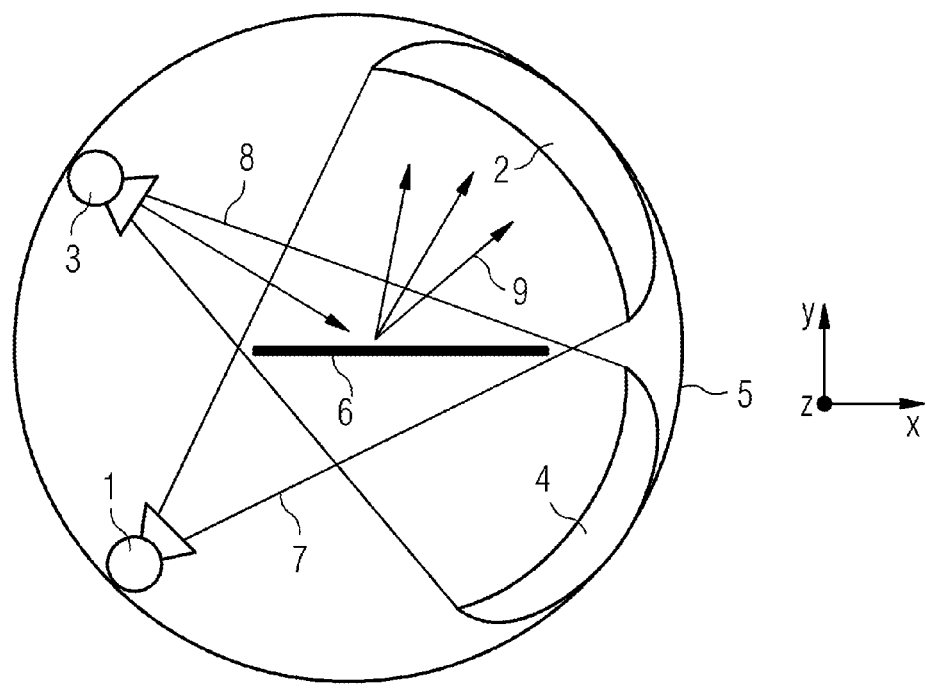
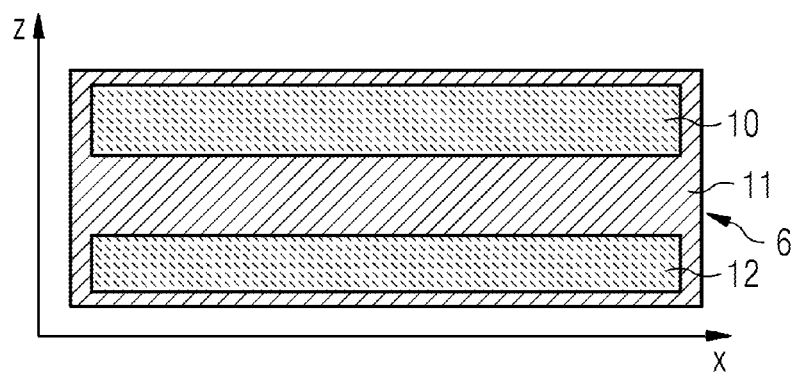

METHOD FOR ENERGY CALIBRATING QUANTUM-COUNTING X-RAY DETECTORS IN A DUAL-SOURCE COMPUTED-TOMOGRAPHY SCANNER

PRIORITY STATEMENT

The present application hereby claims priority under 35 U.S.C. §119 to German patent application number DE 10 2012 204 350.0 filed Mar. 20, 2012, the entire contents of which are hereby incorporated herein by reference.

FIELD

At least one embodiment of the present invention generally relates to a method for energy calibrating quantum-counting x-ray detectors in an x-ray installation having at least two x-ray systems that can be turned around a center of rotation and are arranged having a mutual angular offset in a direction of rotation. An x-ray installation of this kind is employed in the field of computed tomography (CT) and is known in one embodiment also by the term dual-source computed-tomography scanner or dual-source c-arm x-ray device. At least one embodiment of the invention also generally relates to a target for producing x-ray fluorescence radiation, which target is suitable for performing the method.

BACKGROUND

Quantum-counting x-ray detectors, referred to also as photon-counting x-ray detectors, have as a rule an arrangement of a plurality of detector elements (pixels) composed of a directly converting semiconductor material. A detected radiation quantum generates in the respective detector element a charge pulse which is converted by the detector's electronic circuitry into a measuring voltage which in one or more comparators is compared with threshold voltages representing different energy levels. A detected photon can in that way be assigned a specific energy and counted accordingly.

Because the size of the charge pulse or, as the case may be, the measuring voltage generated therefrom depends on the energy of the incident radiation quantum, the radiation quanta that are counted can be spectrally selected via the setting chosen for the electric threshold height or, as the case may be, the threshold value of the comparator. The only radiation quanta that will be counted are those which owing to their energy produce an electric signal exceeding the comparator's threshold value.

For counting the incident x-ray quanta on an energy-resolved basis the detector needs to be energy calibrated. Calibrating has to be performed separately for each detector element or, as the case may be, measuring channel in order to take account in each case of the specific behavior of the detector material and signal-processing electronic circuitry. Setting the threshold voltages as precisely as possible is crucial to achieving a homogeneous response behavior on the part of the detector and hence, for example when the detector is employed in computed tomography, to obtaining CT images that are as artifact-free as possible and exhibit low drift. For energy calibrating quantum-counting x-ray detectors it is possible to use, for example, radioactive compounds, synchrotron-light sources, or K-fluorescence radiation sources that emit defined spectral lines or quanta. Each threshold value of the comparator is assigned an energy threshold as the result of energy calibrating.

Because some of the sources suitable for calibrating pose problems with handling and are not readily available, an option is to employ fluorescence calibrating using K-fluorescence radiators that are not subject to such limitations. Fluorescence calibrating has, though, hitherto been performed in a laboratory, with the x-ray detectors being illuminated exclusively by way of x-ray fluorescence radiation. The x-ray flux then occurring is very slight and accordingly not matched to a scenario applying to a clinical scanner. Because, however, the detectors (sensor material or, as the case may be, detector elements and signal-processing electronic circuitry or, as the case may be, ASICs) assume a different operating point when being irradiated, the laboratory calibrations are not optimally matched to the conditions applying to use in the x-ray installation so that what results is a shift in the threshold values.

SUMMARY

At least one embodiment of the invention is directed to a method for energy calibrating quantum-counting x-ray detectors in an x-ray installation having at least two x-ray systems that can be turned around a center of rotation. At least one embodiment of the method reduces or even obviates the above problem of threshold-value shifting.

Advantageous embodiments of the method are the subject matter of the dependent claims or are contained in the following description and the exemplary embodiments.

The proposed method of at least one embodiment relates to energy calibrating quantum-counting x-ray detectors in x-ray installations that are employed in computed tomography and have at least two x-ray systems that can be turned around a center of rotation and are arranged having a mutual angular offset in a direction of rotation. X-ray installations of such kind are known in one embodiment also as what are termed dual-source computed-tomography scanners or dual-source c-arm x-ray devices. Each of the x-ray systems arranged having a mutual angular offset therein has an x-ray tube and an x-ray detector situated opposite the x-ray tube.

With at least one embodiment of the proposed method the technology of fluorescence calibrating is used for energy calibrating at least one of the x-ray installation's two detectors. A target for producing the x-ray fluorescence radiation is therein positioned between the x-ray source and the x-ray detector of one of the two x-ray systems, referred to in the following as the first x-ray system, and irradiated with the x-radiation of said x-ray system's x-ray source for emitting x-ray fluorescence radiation. The target is therein positioned such that a part of the x-ray fluorescence radiation that is produced will strike the other (second) x-ray system's detector. The second x-ray detector will then be energy calibrated using the x-ray fluorescence radiation that strikes. Mutually offsetting the two x-ray systems in the x-ray installation prevents the x-radiation used for producing the x-ray fluorescence radiation from likewise striking the detector being calibrated.

BRIEF DESCRIPTION OF THE DRAWINGS

The proposed method and associated target are explained again in more detail below with the aid of example embodiments in conjunction with the drawings:

FIG. 1 shows an example of the target's arrangement in a dual-source computed-tomography scanner for performing the proposed method, FIG. 2 shows a first example of an embodiment of the target viewed from above.

DETAILED DESCRIPTION OF THE EXAMPLE EMBODIMENTS

Figure 3:
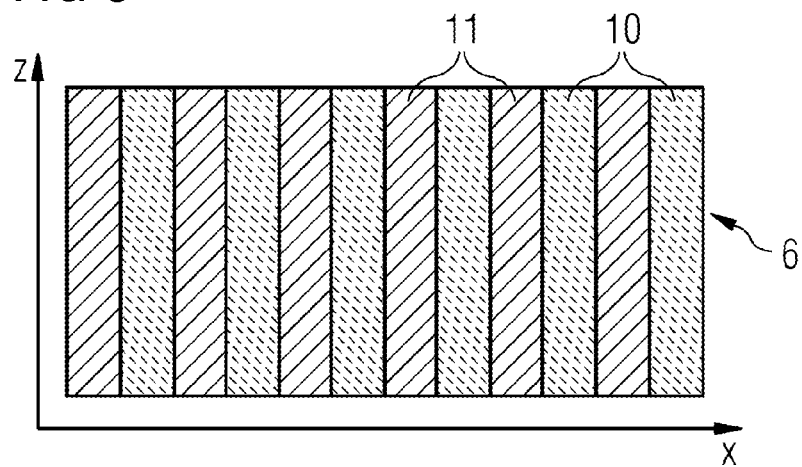
FIG. 3 shows a second example of an embodiment of the target viewed from above.
Figure 4:
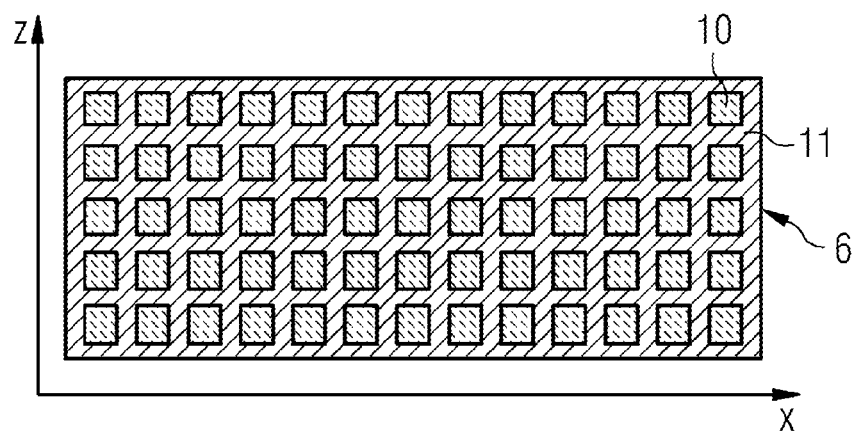
FIG. 4 shows a third example of an embodiment of the target viewed from above.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The proposed method of at least one embodiment relates to energy calibrating quantum-counting x-ray detectors in x-ray installations that are employed in computed tomography and have at least two x-ray systems that can be turned around a center of rotation and are arranged having a mutual angular offset in a direction of rotation. X-ray installations of such kind are known in one embodiment also as what are termed dual-source computed-tomography scanners or dual-source c-arm x-ray devices. Each of the x-ray systems arranged having a mutual angular offset therein has an x-ray tube and an x-ray detector situated opposite the x-ray tube.

With at least one embodiment of the proposed method the technology of fluorescence calibrating is used for energy calibrating at least one of the x-ray installation's two detectors. A target for producing the x-ray fluorescence radiation is therein positioned between the x-ray source and the x-ray detector of one of the two x-ray systems, referred to in the following as the first x-ray system, and irradiated with the x-radiation of said x-ray system's x-ray source for emitting x-ray fluorescence radiation. The target is therein positioned such that a part of the x-ray fluorescence radiation that is produced will strike the other (second) x-ray system's detector. The second x-ray detector will then be energy calibrated using the x-ray fluorescence radiation that strikes. Mutually offsetting the two x-ray systems in the x-ray installation prevents the x-radiation used for producing the x-ray fluorescence radiation from likewise striking the detector being calibrated.

The x-ray detectors can on the other hand thereby be energy calibrated at no further expense simply by inserting the target in the form of, for example, a phantom at a suitable location in the two x-ray systems' beam path. The target can then in a similar manner be analogously positioned in the second x-ray system's beam path for calibrating the first x-ray detector. When the target is positioned in the respective computed-tomography scanner's or c-arm device's isocenter the two detectors can then be energy calibrated just by switching over between the two x-ray tubes and, if necessary, by suitably turning the target in the isocenter.

The target can therein include, for example, a substrate embedded in which are suitable materials for producing the desired x-ray fluorescence radiation at known wavelengths. What therein is understood by x-ray fluorescence is the emission of characteristic secondary x-ray quanta by chemical elements that were excited to emit through being irradiated with the primary x-radiation. An electron occupying the innermost shell (K shell) is therein ejected from the chemical element's atom by the energy of the primary x-radiation. The gap left is immediately filled by an electron from a higher shell, with the difference in energy being released in the form of x-ray fluorescence radiation. Because the energy levels of the K shells or, as the case may be, the energy positions of the K edges of different chemical elements mutually differ, the x-ray fluorescence radiation that is produced is also characteristic for each chemical element.

Molybdenum, tin, iodine, gadolinium, and/or tungsten are examples of suitable materials or, as the case may be, chemical elements that can be used for producing the x-ray fluorescence radiation. Other elements whose characteristic x-ray fluorescence radiation is within the range wanted for energy calibrating the x-ray detectors are of course also possible. The individual elements can therein be present in a mixture or in mutually separate regions within the target. Thus the materials can be present in, for example, powder and/or granular form. A mixture of this kind will then preferably have been mechanically stabilized, for example suitably compacted. The chemical elements selected for producing the x-ray fluorescence can be present in the form also of an alloy.

The target's substrate can be formed also from a material producing an x-ray fluorescence. The selected chemical elements are in another embodiment arranged in layers one above the other so that the target includes a sequence of multiple thin layers, with each layer being formed from one of the selected chemical elements. Layers of such kind can be produced by, for example, anodizing, wet deposition or sputtering, and/or by being sprayed on. The thickness of the individual layers must therein have been selected such that x-ray fluorescence can be excited in all layers by the x-radiation that strikes and said x-ray fluorescence can also exit the target, meaning will not be completely absorbed by the respectively overlying layers.

The target is embodied preferably as plate-shaped or cuboid and can be employed like a phantom in the x-ray installation. In an advantageous embodiment the target has at least two different regions that are composed of different materials and which in a view onto the target are mutually delimited. The regions are therein preferably arranged within the target such that by suitably setting beam masks on the x-ray sources in each case only one of the regions will be irradiated by the x-radiation in order thereby to selectively excite only the material in the region to produce x-ray fluorescence which will then strike the x-ray detector being calibrated. The other region for producing x-ray fluorescence can then be irradiated by adjusting the beam masks accordingly. That is not, of course, limited to two regions. The regions are herein embodied (as viewed from above) preferably as stripe-shaped within the target, with the stripes extending in the x-ray system's direction of rotation (what is termed the phi direction) during use in the x-ray system.

In another embodiment of the proposed method and associated target said target also has regions that are highly permeable to the x-radiation of the x-ray installation's x-ray sources. A conditioning process can consequently be performed while an x-ray detector is being energy calibrated by also operating the x-ray source opposite the x-ray detector being calibrated at the same time as the x-ray fluorescence is produced. The x-ray source's x-radiation can therein strike the x-ray detector through the target's accordingly permeable regions. The x-ray source is therein operated such as to emit a low-energy x-ray spectrum in order to take the x-ray detector being calibrated to the desired operating point.

As an alternative to the last-cited embodiment the x-ray detector being calibrated can of course also be conditioned by illuminating it with x-radiation by way of the opposite x-ray source before the target is put into the beam path in order to take said detector to the desired operating point. The target will then be positioned immediately after the x-ray source has been deactivated and the other x-ray source will be operated for producing the x-ray fluorescence radiation.

The target that is suitable for the method and serves to produce the x-ray fluorescence radiation accordingly includes a first material embedded in which are one or more regions composed of one or more second materials that will emit x-ray fluorescence radiation when excited by x-radiation. The first material can therein likewise be a material that is suitable for producing x-ray fluorescence radiation. Said first material is, however, in an advantageous embodiment extremely permeable to the x-ray installation's x-radiation. The first material can also be, for example, water. The target will then in that case be suitably encased as in the case of a water phantom. The first and second regions (as viewed onto the target) preferably mutually alternate. The regions can therein be embodied as, for example, stripe-shaped. Possible also is a grid-shaped structure in the case of which the first material will then form a grid structure in whose spaces the second material is embedded. The first material can therein, if necessary, form the substrate for the target providing the target's mechanical stabilizing.

FIG. 1 shows in highly schematic form a part of a dual-source computed-tomography scanner having a suitably positioned target 6 for performing the proposed method. To be seen in the figure are the two x-ray systems A, B includes A x-ray tube 1 and A x-ray detector 2 and of B x-ray tube 3 and B x-ray detector 4 that are arranged on gantry 5 of the computed-tomography scanner. The two x-ray systems are therein arranged mutually offset by an angle of 90° in the gantry's direction of rotation, as can be seen in FIG. 1. The gantry's direction of rotation is indicated by the curved arrow.

For energy calibrating A x-ray detector 2, in the present example a fluorescence target 6 is arranged within x-ray beam 8 of B x-ray tube 3 such as to be evenly illuminated by said beam and such that x-ray fluorescence radiation 9 produced thereby will strike A x-ray detector 2 being calibrated. A x-ray detector 2 will therein be calibrated with the aid of B x-ray tube 3 because the fluorescence radiation has to be separated from the primary radiation. The primary radiation of x-ray beam 8 emitted by B x-ray tube 3 will owing to the geometric arrangement not strike A x-ray detector 2. The x-ray fluorescence photons produced in target 6 by the x-radiation of B x-ray tube 3 will be radiated isotropically and so also strike A x-ray detector 2. Even irradiating of fluorescence target 6 means that each detector element will be illuminated by the fluorescence radiation even if there is an anti-scatter grid on A x-ray detector 2.

It is possible for A x-ray detector 2 to be conditioned by means of A x-ray tube 1. That can be done in keeping with the application prior to the calibration measurement in order to take A x-ray detector 2 to the desired operating point. That is always possible when target 6 is moved out of the beam path of A x-ray tube 1 (x-ray beam 7).

Conditioning of such kind is possible only in the phi direction (the gantry's direction of rotation) when an anti-scatter grid is used, even by simultaneously irradiating the A x-ray detector 2 with a low-energy x-ray spectrum by way of A x-ray tube 1, with the fluorescence-to-background ratio then having to be matched. The result of the simultaneous irradiating is that the A x-ray detector will have been exposed to a greater x-ray flux (with a lower energy spectrum) and at the same time a clearly discernible signature will be measurable by way of the fluorescence components or, as the case may be, fluorescence lines in the signals.

B x-ray detector 4 is energy calibrated in the same way, with A x-ray tube 1 then being operated for producing the x-ray fluorescence radiation. Fluorescence target 6 will therein not have to be moved if suitably embodied (fluorescence materials on both sides), as can be inferred from FIG. 1.

FIG. 2 is a view onto a possible target 6 in the case of which simultaneous measuring of a fluorescence energy and direct irradiating through a transparent substrate or water phantom are possible. Target 6 has in this region, as viewed from above, two regions 10, 12 that are spaced apart and consist of different materials emitting x-ray fluorescence. Embodied between the two regions 10, 12 is a region 11 that can consist of a material that is transparent for x-radiation or of water. The x and z directions that are indicated in said figure correspond to those in FIG. 1. The z direction is therein the direction of the computed-tomography scanner's known system axis. In these examples the composition of the regions or, as the case may be, materials shown in FIGS. 2 to 6 does not change in the y direction (not shown) corresponding to the target's or, as the case may be, phantom's thickness direction.

Because of the stripe-shaped embodiment of the different regions 10, 11, 12 it is possible to illuminate the different regions separately by setting the collimating masks on the computed-tomography scanner's x-ray tubes accordingly. Thus given an appropriate setting for the beam masks in the case of target 6 shown in FIG. 2 it will also be possible to measure at least one second fluorescence energy (from region 12) separately from measuring the first fluorescence energy (from region 10).

FIG. 3 shows another example of a possible arrangement of the regions of different materials 10, 11 in an exemplary target. The different materials of the different regions 10, 11 can here, too, be materials that emit x-ray fluorescence radiation or an embodiment in the case of which at least one region 11 is permeable to x-radiation. Alongside a stripe-shaped embodiment of such kind it is possible also for the fluorescence material or the substrate to be arranged in, for example, a grid shape as shown schematically in FIG. 4. If a material that is transparent for x-radiation is used for region 11, calibrating can be performed through simultaneous direct illuminating with x-ray light by the respectively opposite x-ray source.

The proposed method will enable the x-ray detector to be energy calibrated by way of x-ray fluorescence radiation under irradiating conditions that are relevant to the system.

Using a dual-source CT system will allow the x-ray tube of one x-ray system to be employed for calibrating the other x-ray system's x-ray detector because the x-ray detector being calibrated is thereby automatically shielded from the primary radiation.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for energy calibrating quantum-counting x-ray detectors in an x-ray installation including at least two x-ray systems that can be turned around a center of rotation and are arranged including a mutual angular offset in a direction of rotation and of which a first x-ray system includes a first x-ray source and an opposing first x-ray detector and a second x-ray system includes a second x-ray source and a second opposing x-ray detector, the method comprising:

positioning a target for producing x-ray fluorescence radiation between the first x-ray source and first x-ray detector;

irradiating the target with x-radiation of the first x-ray source in such a way that x-ray fluorescence radiation, which strikes the second x-ray detector from the target, is produced by the x-radiation of the first x-ray source; and energy calibrating the second x-ray detector by way of the x-ray fluorescence radiation of the target.

2. The method of claim 1, wherein the second x-ray detector is conditioned before or while being calibrated by operation of the second x-ray source.

3. The method of claim 2, wherein the target is positioned between the first x-ray source and first x-ray detector such that, with no change to position or orientation, the target is irradiateable with x-radiation of the second x-ray source after the second x-ray detector has been calibrated and x-ray fluorescence produced thereby will strike the first x-ray detector, and wherein the target will be irradiated with x-radiation of the second x-ray source after the second x-ray detector has been calibrated and the first x-ray detector will be energy calibrated by way of the produced x-ray fluorescence radiation of the target.

4. The method of claim 2, wherein after the second x-ray detector has been calibrated, the target for producing the x-ray fluorescence radiation is positioned between the second x-ray source and second x-ray detector and irradiated with x-radiation of the second x-ray source in such a way that x-ray fluorescence radiation which strikes the first x-ray detector is produced by the x-radiation of the second x-ray source and the first x-ray detector is energy calibrated by way of the x-ray fluorescence radiation of the target.

5. The method of claim 1, wherein the target is positioned between the first x-ray source and first x-ray detector such that, with no change to position or orientation, the target is irradiateable with x-radiation of the second x-ray source after the second x-ray detector has been calibrated and x-ray fluorescence produced thereby will strike the first x-ray detector, and wherein the target will be irradiated with x-radiation of the second x-ray source after the second x-ray detector has been calibrated and the first x-ray detector will be energy calibrated by way of the produced x-ray fluorescence radiation of the target.

6. The method of claim 5, wherein the first x-ray detector is conditioned before or while being calibrated by operation of the first x-ray source.

7. The method of claim 1, wherein after the second x-ray detector has been calibrated, the target for producing the x-ray fluorescence radiation is positioned between the second x-ray source and second x-ray detector and irradiated with x-radiation of the second x-ray source in such a way that x-ray fluorescence radiation which strikes the first x-ray detector is produced by the x-radiation of the second x-ray source and the first x-ray detector is energy calibrated by way of the x-ray fluorescence radiation of the target.

8. The method of claim 7, wherein the first x-ray detector is conditioned before or while being calibrated by operation of the first x-ray source.

9. The method of claim 1, wherein a target, including at least two regions composed of different materials, is used for producing the x-ray fluorescence radiation.

10. The method of claim 9, wherein the at least two regions are arranged such that, by setting at least one beam mask in front of at least one of the first and second x-ray source, in each case the x-ray fluorescence radiation striking at least one of the first and second x-ray detector can be limited to each of the regions.

11. The method of claim 10, wherein at least two of the regions are irradiated successively by changing the setting of the beam mask in front of at least one of the first and second x-ray source.

12. The method of claim 9, wherein regions including a material suitable for producing the x-ray fluorescence radiation alternate with regions that are permeable to the x-radiation of at least one of the first and second x-ray source.

* * * * *